United States Patent [19]

Park et al.

[11] Patent Number: 4,576,277

[45] Date of Patent: Mar. 18, 1986

[54] CONVEYOR SYSTEM WITH REMOVABLE WEAR MEMBERS

[75] Inventors: David B. Park, R.D. #2, Box 2730, Spring Grove, Pa. 17362; James R. Snyder, York, Pa.; Gerard J. McDonald, York, Pa.; Roland Hoet, York, Pa.

[73] Assignee: David B. Park, Middleboro, Mass.

[21] Appl. No.: 541,008

[22] Filed: Oct. 11, 1983

[51] Int. Cl.[4] .............................................. B65G 47/84
[52] U.S. Cl. ................................. 198/803.01; 198/841; 198/853
[58] Field of Search .............. 198/841, 852, 851, 853, 198/648; 474/207, 234, 235

[56] References Cited

U.S. PATENT DOCUMENTS

| 1,539,808 | 5/1925 | Allsop | 198/648 |
| 3,094,206 | 6/1963 | Stewart et al. | 98/841 X |
| 3,788,455 | 1/1974 | Dieckmann | 198/841 X |
| 3,952,860 | 4/1976 | Specht | 198/648 X |

Primary Examiner—Joseph E. Valenza
Assistant Examiner—Jonathan D. Holmes
Attorney, Agent, or Firm—Burns, Doane, Swecker & Mathis

[57] ABSTRACT

A conveyor installation comprises a framework having stationary guides with plastic contact surfaces. A conveyor belt is mounted for travel on the framework and includes plastic carriers mounted on plastic chain links. The carriers are supported for sliding contact with some of the guides which define vertical support rails. The carriers are connected to the links by upstanding coupling members. Plastic clip-on sleeves are mounted on the coupling members for engagement with some of the stationary guides to minimize wear of the chain, while assuring a low friction sliding contact between the chain and the guides. Snap-on pan guides are insertable into recesses of the carriers.

5 Claims, 10 Drawing Figures

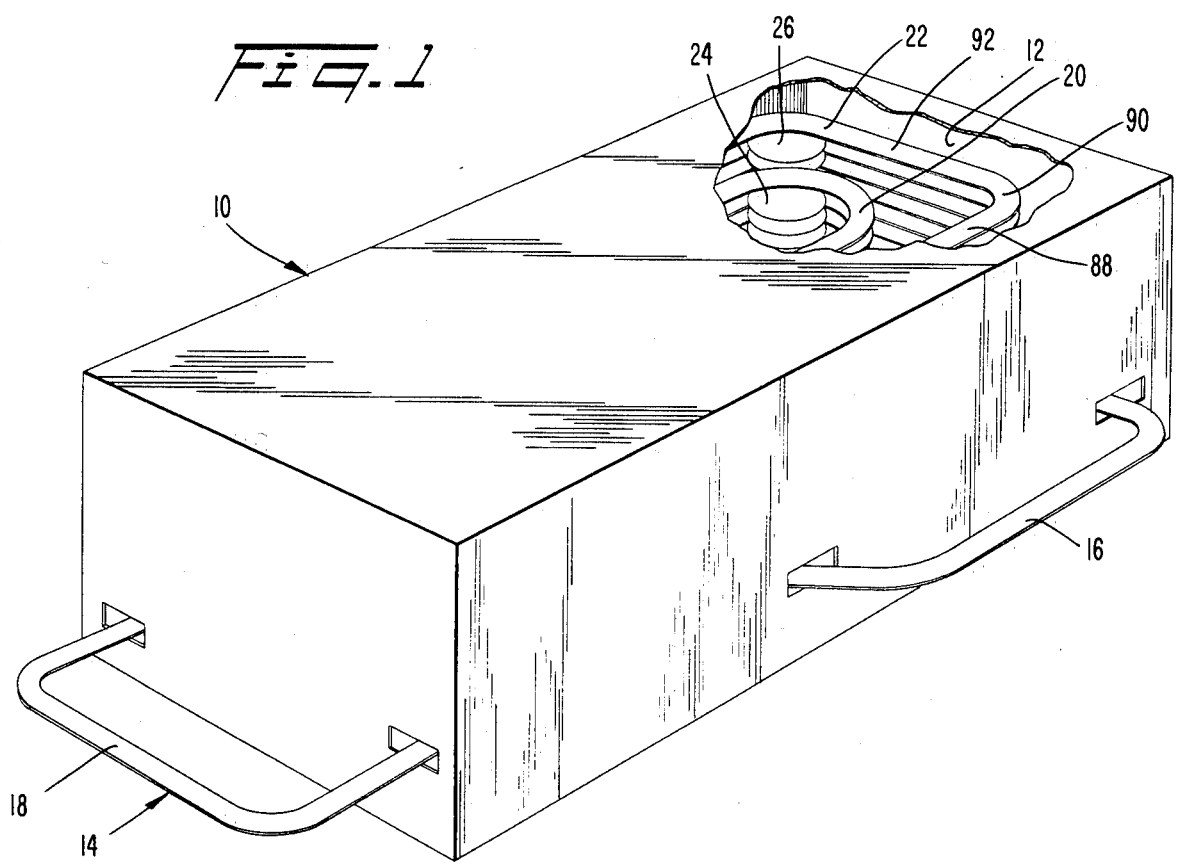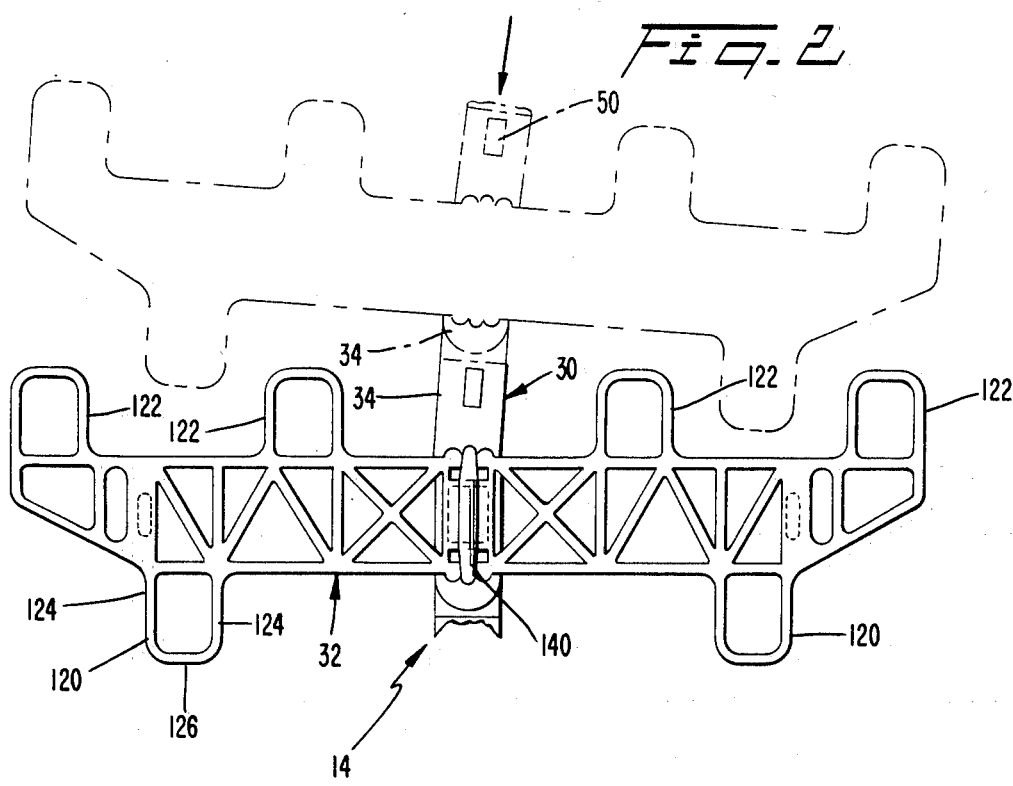

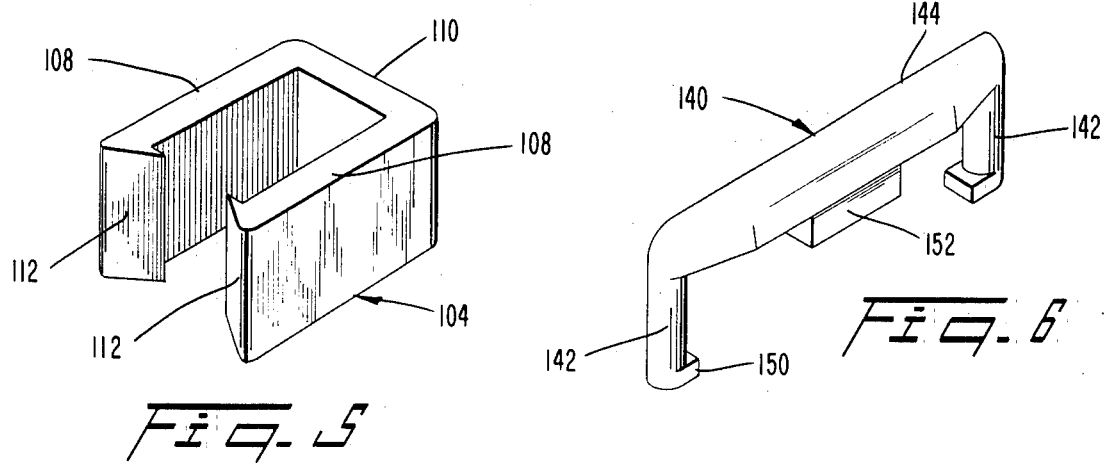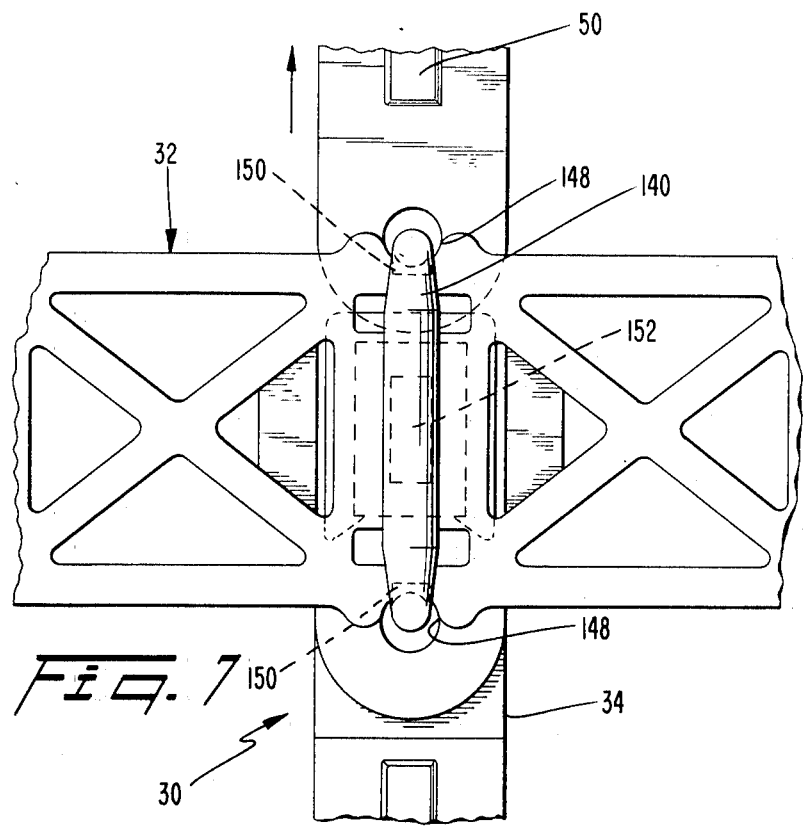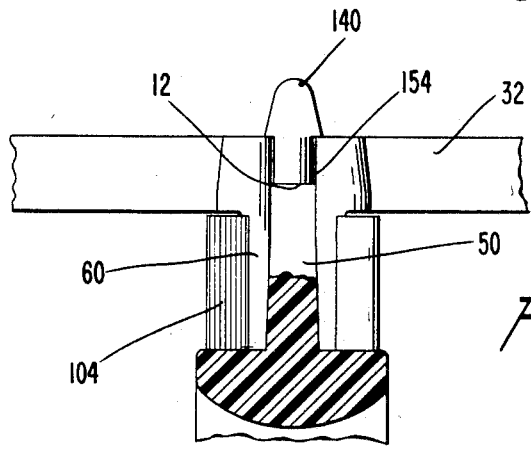

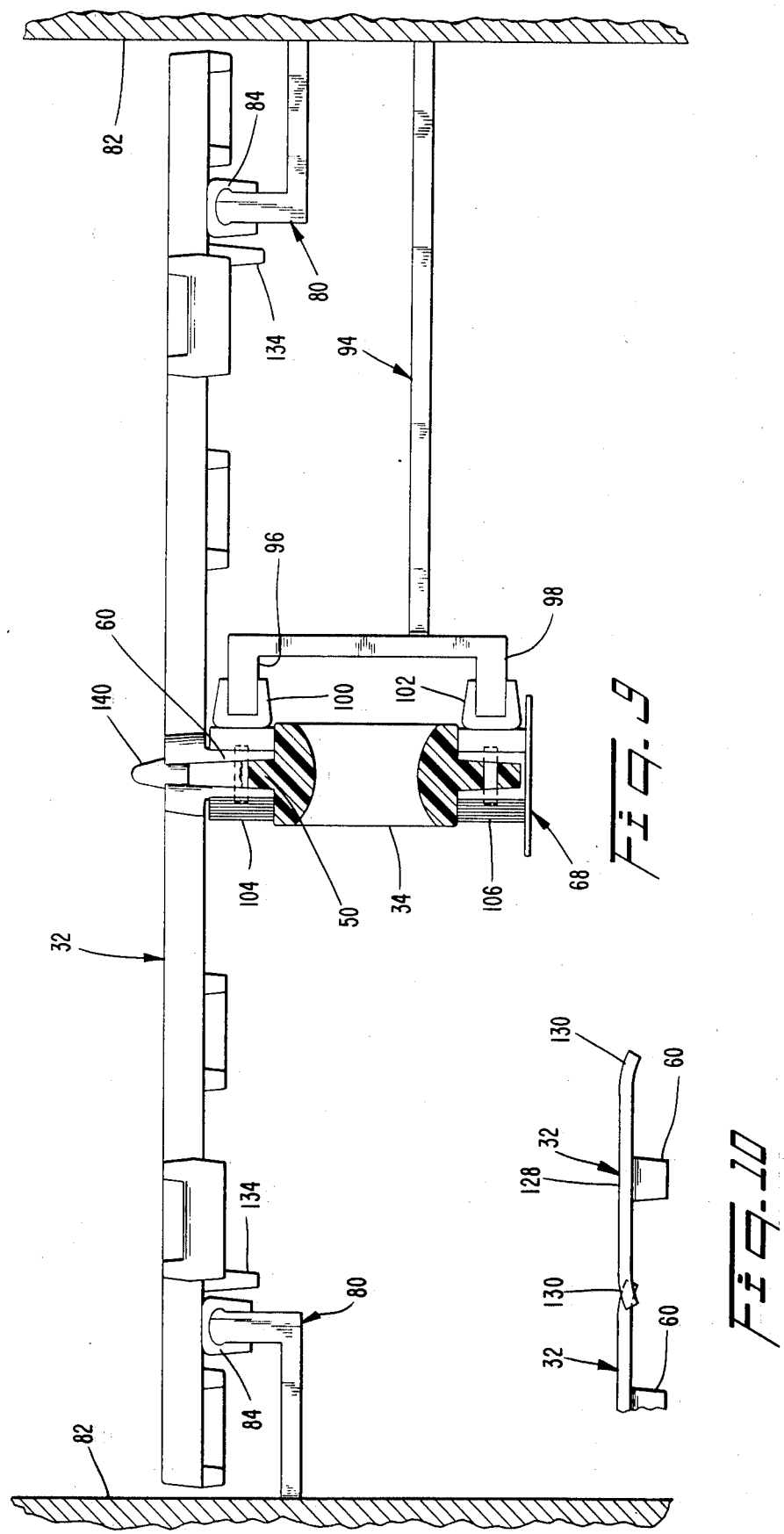

CONVEYOR SYSTEM WITH REMOVABLE WEAR MEMBERS

BACKGROUND AND OBJECTS OF THE INVENTION

The present invention relates to conveying and, in particular, to the conveying of pans of food products through a controlled environment.

It is conventional to conduct products, such as foodstuffs, for example, through a chamber wherein the environment (temperature, humidity, etc.) is controlled. In the case of bakery or dough products such a chamber may comprise a proofer wherein the products are conveyed for an extended period upon a helically arranged conveyor. Commonly, the conveyor comprises an endless chain having wheels which travel along a guide track. However, the wheels require lubrication, which raises the possibility of lubricant falling into and contaminating the food being conveyed. Also, the lubricant can retain dust and other foreign particles, thus creating unsanitary conditions. Unsanitary conditions are exacerbated by the reluctance to wash the conveyor since washing removes the needed lubricant.

In a conveyor system disclosed in U.S. Pat. No. 3,450,250 issued to Frisk on June 17, 1969, a conveyor chain is proposed which contains no wheels or wheel bearings. That proposal involves positioning stationary support rails beneath metal carriers which are mounted on the metal chain by means of metal brackets. The rails are covered with strips of plastic material. In regions where the conveyor changes direction, a curved stationary guide is provided which is positioned to contact and laterally stabilize the metal chain. The guide is covered by a plastic strip.

It would be desirable to provide a conveyor which avoids the need for support wheels and wheel bearings. However, it is also desirable to minimize friction without requiring frequent replacement of the major components, such as the chain. Despite any advantages which may have been achieved by Frisk's plastic-to-metal sliding contact, substantial room for improvement remains.

It is, therefore, an object to minimize or obviate disadvantages previously present in the art.

A further object is to eliminate the need to apply lubricant to a conveyor.

Another object is to provide a conveyor which generates minimal friction during travel and yet is relatively inexpensive to maintain.

Another object is to provide a conveyor in which the chain is slidably supported by means of plastic-to-plastic surface contact.

A further object is to provide a replaceable plastic surface on a conveyor chain.

Another object is to provide a snap-on pan guide for a conveyor.

BRIEF SUMMARY OF THE INVENTION

These objects are achieved in accordance with the present invention which involves a conveyor comprising a chain and carriers mounted thereon. The chain includes a plurality of links connected together for relative pivotal movement. The carriers are mounted on at least some of the links. A plurality of plastic wear members are removably insertable onto at least some of the links to define replaceable wear surfaces adapted to engage stationary guides.

Any external wear on the chain resulting from contact with lateral support members is taken-up by the removable wear members which are easily replaceable, thus increasing the life span of the chain. The wear members preferably comprise clip-on sleeves which are easily installed and removed.

Preferably the carriers, links, guides, and replaceable wear members are all formed of suitable plastics to meet the different requirements of each part, and defining a clean, low friction, long-lasting, plastic-to-plastic conveyor.

The carriers include clip-on pan guides to laterally stabilize pans disposed on the carriers.

THE DRAWINGS

The objects and advantages of the invention will become apparent from the following detailed description of a preferred embodiment thereof, in connection with the accompanying drawings, in which like numerals designate like elements, and in which:

FIG. 1 is a perspective view of a proofer, with a portion thereof broken away to expose a conveyor traveling therein;

FIG. 2 is a plan view of a conveyor belt adapted to carry articles through the proofer;

FIG. 5 is a perspective view of a clip-on wear sleeve which is insertable onto the conveyor chain;

FIG. 6 is a perspective view of a pan guide which is insertable onto carrier elements of the conveyor;

FIG. 7 is a fragmentary plan view of the conveyor belt, depicting the pan guide disposed thereon;

FIG. 8 is a vertical sectional view taken in a direction transverse to the direction of conveyor travel and depicting the pan guide in an installed condition;

FIG. 9 is a view similar to FIG. 4, depicting both rails upon which the conveyor elements are supported; and FIG. 10 is a schematic side view depicting the manner in which the carrier elements are disposed relative to one another during travel along a straight-away portion of the conveyor travel path.

DETAILED DESCRIPTION OF A PREFERRED EMBODIMENT OF THE INVENTION

Figure 3:
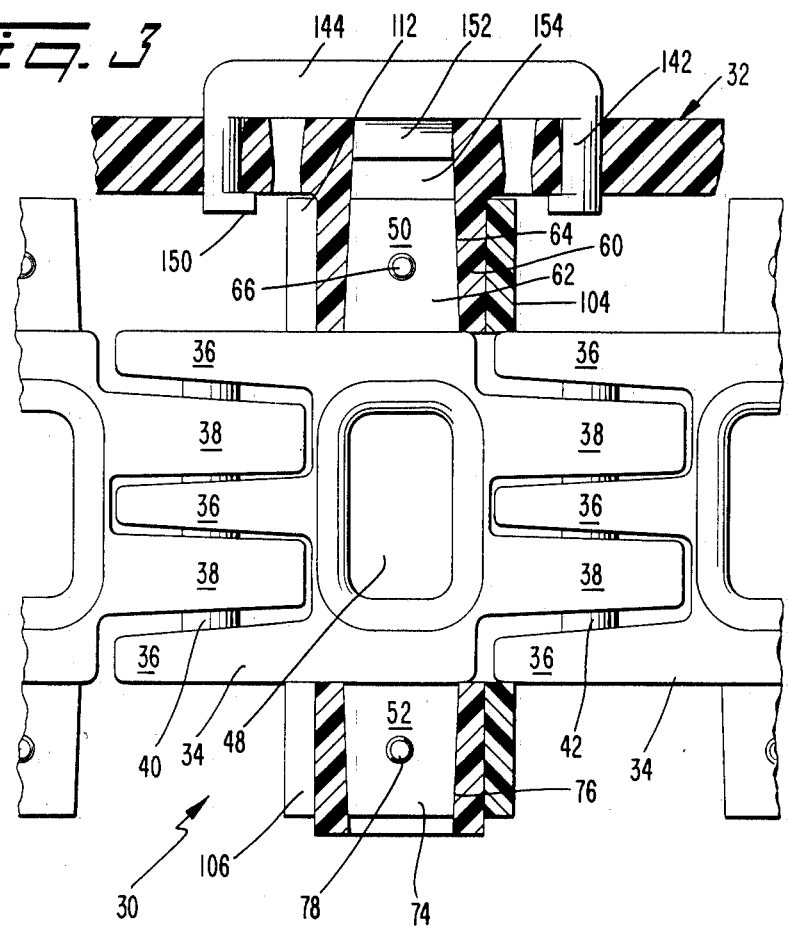
FIG. 3 is a longitudinal vertical sectional view taken through the conveyor belt.
Figure 4:
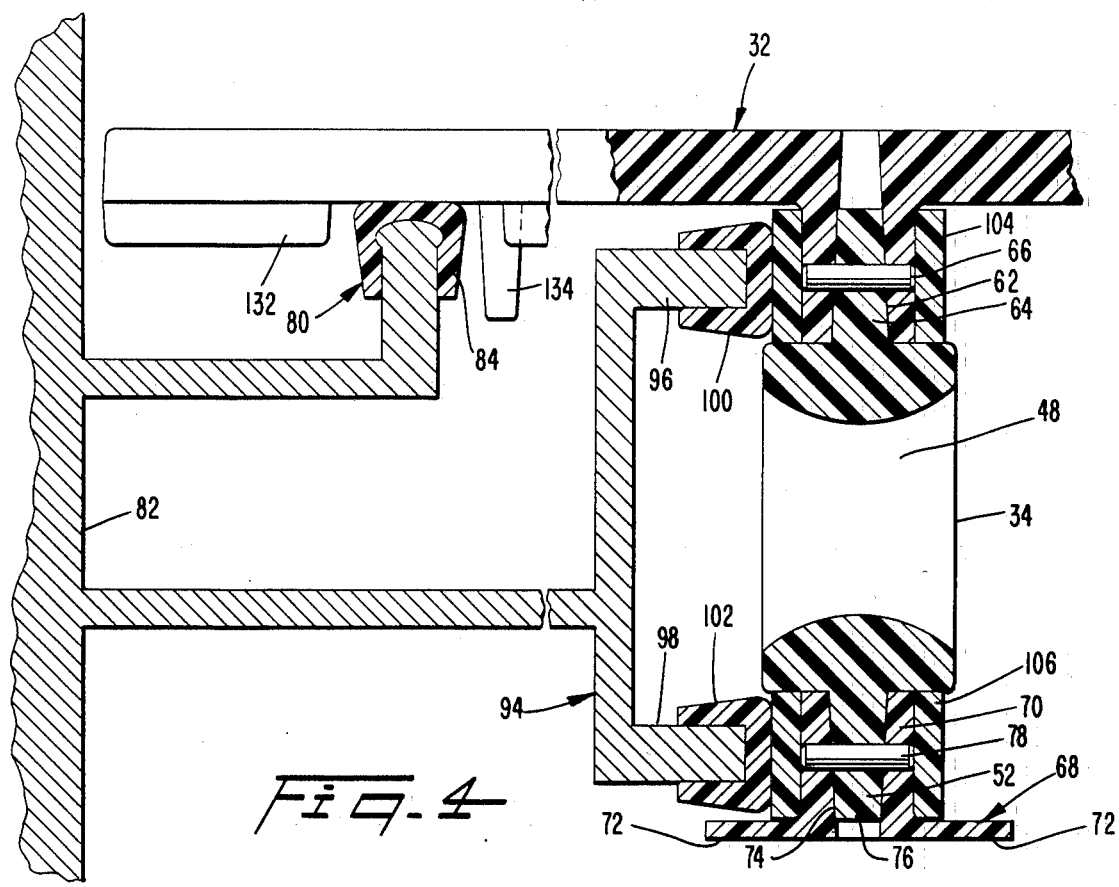
FIG. 4 is a vertical sectional view taken in a direction perpendicular to the direction of conveyor travel and depicting stationary guides mounted on the conveyor framework.

Depicted in FIG. 1 in an enclosure 10 which defines therein a proofer chamber 12 for the processing of food such as dough products like bread loaves and rolls, for example. Conventional equipment (not shown) is provided for maintaining desired atmospheric conditions within the chamber for proofing the dough products.

The dough is disposed within pans (not shown) that ride upon a transport conveyor 14. The transport conveyor 14 (depicted only schematically in FIG. 1) has product take-off and infeed sections 16, 18, respectively, disposed outside of the enclosure 10. Within the enclosure 10, the conveyor forms inner and outer generally helically traveling conveying sections 20, 22 which together form a continuous conveyor path for the pans and convey the pans through a relatively extensive path. For example, the conveyor may travel upwardly along the outside and then downwardly along the inside. A drive mechanism for the conveyor includes a series of driven sprocket wheels 24, 26 which intermesh with a chain portion of the conveyor to advance the latter.

The conveyor 14 comprises a chain 30 (FIG. 2) upon which a series of grid-like pan carriers or wings 32 are mounted. The chain is formed of a plastic material and can be generally of the type disclosed in U.S. Pat. Nos. 3,641,831 and 3,826,150 issued to Karl V. Palmaer on Feb. 15, 1972 and July 30, 1974, respectively, the disclosure of which is incorporated herein by reference. The chain 30 comprises a series of identical links 34 (FIG. 3) which each have outwardly projecting coupling arms 36, 38. The coupling arms 36, 38 of successive links intermesh and are secured together by vertical pivot pins 40, 42 which are mounted in aligned openings of the intermeshing arms to permit relative rotation between adjacent links 34. A horizontally open socket 48 is disposed in each link and is adapted to receive the teeth of the sprocket wheels 24, 26 to advance the chain.

At least those links 32 which support a carrier include a pair of vertical coupling posts 50, 52 projecting upwardly and downwardly, respectively, from a body portion of the link. The posts 50, 52 preferably constitute integrally molded components of the plastic links 34 The pan carriers 32 are mounted to the upper posts 50 on alternating ones of the links 34. If desired, all of the links may contain posts.

The carriers 32 are preferably molded of plastic and are characterized by a gridwork type of construction (see FIG. 2) which is air pervious in order to promote air travel through the conveyor and against the pans which are carried by the conveyor, and to enhance the cleanability of the conveyor.

Each carrier 32 includes a downwardly open coupling socket 60 of rectangular cross-section which fits over the rectangular upper post 50 of the associated link 34. Preferably, the side faces 62 and end faces 64 of the posts 50 taper outwardly (i.e., converge in a direction away from a body portion of the link), and engage complementarily tapered walls of the sockets 60 to create a snugfit therebetween.

The socket and post may contain holes which are mutually alignable so as to receive a plastic dowel pin 66 for positively locking the socket to the post. The pin 66 extends perpendicularly to the longitudinal axis of the chain as viewed from above, and is secured by friction-fit within the holes.

Mounted on the lower posts 52 are hold-down feet 68. The hold-down feet each include a socket 70 and lateral flanges 72. As described above, in connection with the upper posts 50, the side faces 74 and end faces 76 of the lower posts 52 are tapered outwardly and make a snug-fit within complementarily tapered faces of the sockets 70. Plastic dowel pins 78 may be mounted by friction-fit within aligned holes in the lower posts 52 and the sockets 70 of the feet 68. The pins 78 are disposed parallel to the pins 66 which couple the upper posts 50 to the carrier sockets 60. As will be explained hereinafter, the hold-down feet prevent the conveyor from rising and/or tipping as it traverses a curved section of its helical path.

During its helical travel, the conveyor 14 is supported upon a pair of stationary support or guide rails 80 which are affixed to a suitable skeletal framework 82 located within the proofer chamber. Each support rail 80 includes a snap-on strip 84 of a low friction plastic material. The support rails 80 are spaced apart laterally relative to the direction of conveyor travel, and the chain 30 is disposed between the support rails 80. The plastic carriers 32 are slidingly supported upon the support rails during conveyor travel. It will be appreciated that a low friction plastic-to-plastic engagement occurs between the plastic carriers 32 and the plastic strips 84 of the rails as the conveyor traverses its helical path.

The helical path comprises relatively straight side runs 88, curved end runs 90 at the ends of the straight side runs, and (on the outer helix 22) straight end runs 92. Along the straight side runs 88 and end runs 92, the support rails 80 provide adequate vertical support for the conveyor. During travel around the curved runs 92, lateral support for the conveyor is needed and is provided by stationary lateral guides 94 which are connected to the framework 82 and are arranged to extend coextensively with the curved runs and parallel thereto. Each lateral guide 94 comprises a pair of vertically spaced arms 96, 98 which carry low friction plastic strips 100, 102 similar to the strips 84 on the rails 80. The strips 100, 102 do not directly engage the sockets 60 of the grids nor the sockets 70 of the hold-down feet 68. Rather, there are provided, in accordance with the present invention, a plurality of clip-on sleeves 104, 106 which can be clipped onto the carrier sockets 60 and onto the sockets 70 of the hold-down feet 68.

The clip-on sleeves 104, 106 are of identical U-shaped construction and each includes a pair of legs 108 interconnected by a bight 110. The outer ends of the legs include laterally inwardly extending fingers 112 which can be beveled to facilitate insertion and removal of the sleeve relative to the respective sockets 60, 70. The clip-on sleeves are of one-piece molded construction and are formed of a suitable low friction plastic material.

Insertion of the clip-on sleeves 104, 106 is accomplished by pushing the open end of the sleeve against the respective socket 60, 70 until the sleeve legs 108 separate resiliently. When the fingers 112 pass beyond the end of the socket, the legs snap back to retain the sleeve in place. Removal of the sleeve is accomplished by spreading apart the legs at the open end of the sleeve and pulling the sleeve from the socket. The open ends of the sleeves face away from the direction of conveyor travel and thus cannot be forced loose in response to acceleration of the conveyor.

Any engagement of the conveyor chain 30 with the lateral guide 94 occurs against the clip-on sleeves 104, 106. Thus, only the latter components 104, 106 of the conveyor chain 30 are subject to wear in response to contact of the chain with the lateral guide 94. If the sleeves 104, 106 become worn, they are replaced.

Once installed, the clip-on sleeves 104, 106 cover the ends of the holes in which the dowel pins 66, 78 are disposed. Accordingly, the sleeves 104, 106 aid in preventing accidental egress of the pins 66, 78 and provide a clean, smooth unbroken running surface for contact by the strips 100.

It will be appreciated that the provision of plasticto-plastic contact between the rails 80 and the carriers 32, and between the guides 94 and the sleeves 104, 106, assures that minimal friction will be generated to oppose travel of the conveyor. Importantly, the chain itself is spared any significant friction-induced wear due to the presence of the replaceable clip-on sleeves 104, 106. The only parts which will be worn are the easily replaceable carriers 32, sleeves 104, 106 and strips 84, 100, 102. The conveyor chain itself will be characterized by a long life-span. Furthermore, the conveyor does not require the intermittent or continuous application of a lubricant and thus avoids any possibility of lubricant, dirt or product spillage falling on the food products being conveyed below.

At those curved portions of the helical travel path at which the drive sprockets 24, 26 are disposed, there are provided a pair of lateral guides 94. One guide includes a slot (not shown), through which the sprocket extends, and the other guide is disposed on the opposite side of the chain to push the chain against the sprocket.

As the conveyor traverses the curved sections 90 of its travel, there may occur a tendency for the conveyor to rise up from intended path. Such rising or tipping movement is prevented as one of the flanges 72 of the hold-down feet 68 engages the lower arm 98 of the lateral guide 94. If the hold-down feet 68 become excessively worn from such contact, they can be easily replaced by removal of lower sleeve 106 and the dowel pin 78. Prevention of conveyor rise-up assures that the carriers 32 will remain generally horizontal, i.e., will not tip to any appreciable extent.

The product carriers 32 each include a plurality of projections 122 extending from a rear side of the carrier, and a plurality of projections 120 extending from a front side of the carrier in laterally offset relationship to the rear projections 120. The projections 120, 122 are generally U-shaped, each including two outwardly extending legs 124 and a bight 126. Outer portions of the projections 120, 122 are curved downwardly as can be seen from FIG. 9. Thus, each carrier defines a series of lead-in surfaces 130 which extends downwardly from a pan-supporting surface 128 defined by the carrier. The lead-in surfaces facilitate the introduction and discharge of pans onto and from the conveyor since the lead-in surfaces are downwardly curved and present no obstruction to sliding entry of the pans onto the carrier. Also, as the carriers traverse a curve, the necessary relative movement between the pans and carriers is facilitated, with less likelihood of the pans becoming hung-up on parts of the carrier.

Projecting downwardly from the underside of each carrier 32 are abutments 134 arranged adjacent the rails 80 to provide lateral stabilization for the conveyor.

In order to establish lateral stabilization for pans seated on the carriers 32, there are provided removable plastic pan guides 140 (FIGS. 6-8). The pan guides 140 are each of U-shaped construction and include a pair of parallel legs 142 interconnected by a bight 144. The legs 142 are spaced apart by a sufficient distance to enter a pair of longitudinally spaced, vertical grooves 148 formed in the respective carrier 32. The legs 142 each include laterally extending fingers 150 arranged to underlie the wing carrier (see FIG. 3) once the legs 142 have been pushed sufficiently downwardly along the grooves 148, in order to secure the pan guide in place. The grooves 148 and/or the fingers 150 can be beveled to facilitate such movement. Bh prying one of the legs 142 outwardly while pulling upwardly on the pan guide, the legs 142 are spread apart to enable the pan guide 140 to be lifted from the grooves 148. A projection 152 extends downwardly from the bight 144 and fits within a recess 154 in the wing, which recess is aligned with the socket 50. This projection and recess arrangement 152, 154 provides a lateral stabilization for the pan guide on the carrier. Once installed, the pan guide 140 will fit into a standard cavity in the pan bottom (not shown) to minimize lateral shifting of the pan along the pan support surface 128 of the carrier 32.

IN OPERATION, the conveyor 14 traverses a helical path within the proofer 10 while carrying pans of dough products to be proofed. The conveyor is supported vertically by virtue of the sliding contact of the plastic carriers 32 upon the plastic surfaces of the rails 80. During travel of the conveyor around curves, the plastic clip-on sleeves 104 contact the plastic surfaces of the guides 94. If the clip-on sleeves become worn, they are replaced, thereby maximizing the life-span of the plastic belt. The clip-on sleeves also prevent accidental dislodgement of the dowel pins 66 and provide a clean, smooth, unbroken running surface for contacting the lateral support members.

Excessive rising of the conveyor is prevented by the plastic hold-down feet 68 which contact the plastic undersides of the guides. The pan guides 140 are easily replaceable by a snap-on/snap-off connection to minimize the time required to install or remove the pan guides. The curved-down projections 120, 122 on the carriers 32 facilitate the transfer of pans from one conveyor to another.

Although the present invention has been described in connection with a preferred embodiment thereof, it will be appreciated by those skilled in the art that additions, modifications, substitutions, and deletions not specifically described, may be made without departing from the spirit and scope of the invention as defined in the appended claims.

What is claimed is:

1. In a conveyor of the type comprising a chain including a plurality of links connected together for relative pivotal movement at least some of said links including an upwardly projecting first coupling element, a plurality of carriers mounted on at least some of said links, said carriers each including integral downwardly projecting second coupling elements, one of said first and second coupling elements comprising a socket and the other of said first and second coupling elements comprising a post received in said socket, and a dowel pin frictionally disposed in aligned holes in each socket and post assembly, the improvement comprising:

a U-shaped wear sleeve mounted on each said socket and comprising a pair of legs interconnected by a bight, said wear sleeve being releasably mounted on its associated socket by a snap-on fit such that said legs are situated on opposite sides of said socket and overlie said holes in said socket to retain the associated pin.

2. A conveyor according to claim 1 including a pan guide removably securable to said carrier, said pan guides including two longitudinally spaced pairs of laterally abreast legs which are arranged to be snap-fit into grooves of said carriers.

3. In a conveyor according to claim 1, wherein said links, said carriers, and said wear sleeves are formed of plastic.

4. In a conveyor installation of the type comprising a support framework including stationary guide members, a conveyor mounted on said framework in engagement with said guide members, said conveyor comprising a chain including a plurality of plastic links connected together for relative pivotal movement, at least some of said links including an upwardly projecting first coupling element, a plurality of plastic carriers mounted on at least some of said links, said carriers each including integral downwardly projecting second coupling elements, one of said first and second coupling elements comprising a socket, and the other of said first and second coupling elements comprising a post received in socket, and a dowel pin frictionally disposed in aligned holes in each socket and post assembly, the improvement comprising:

a U-shaped plastic wear sleeve mounted on each said socket for engaging said guide members, said wear sleeve comprising a pair of legs interconnected by a bight, said wear sleeve being releasably mounted on its associated socket by a snap-on fit such that said legs are situated on opposite sides of said socket and overlie said holes in said socket to retain the associated pin.

5. A conveyor according to claim 4 including a pan guide removably securable to said carrier, said pan guides including two longitudinally spaced pairs of laterally abreast legs which are arranged to be snap-fit into grooves of said carriers.

* * * * *